3,083,108
METHOD OF PREPARING FREEZE-DEHYDRATED MEAT MIXES

Gale D. Kline, Melrose Park, and James M. Blair, Hinsdale, Ill., assignors to Armour and Company, Chicago, Ill., a corporation of Delaware
No Drawing. Filed Feb. 23, 1961, Ser. No. 90,978
9 Claims. (Cl. 99—208)

This invention relates to a method of preparing freeze-dehydrated meat mixes. The meat mixes prepared by the method of this invention may be used in a variety of ways, as, for example, in the preparation of meat loaves, meatballs, hamburger patties, meat sauces for spaghetti, etc.

It is known that meats and other food materials may be preserved by a process known as freeze drying. Heretofore, the preservation of food products by freeze drying has received relatively little commercial application, being limited to products which are especially adapted to this technique, such as shrimps, mushrooms, etc. Some experimental freeze-dehydrated foods have been developed; these have been essentially single component products such as lean beefsteaks, fish sticks, scrambled eggs, shrimp, chicken pieces, and sliced cooked beef. With adequate prefreezing, these rather simple products in their "natural" form present uniform, easily followed freeze-dehydration patterns and when rehydrated, closely resemble their original fresh state. Meat mixes, because of the complexity of their composition and their disintegrated physical form, have not been readily adaptable to freeze-dehydration. The freeze-dehydration of such meat mixes presents special and unusual problems, which up to now have not been solved satisfactorily.

In the preparation of meat loaf mixes for commercial distribution and sale, it is desirable to employ two principal classes of ingredients. One of these is ground fresh meat, and the other may be described as a partially dehydrated food material, such as air-dried vegetables, cereal binders, dried dairy products, and the like. When fresh meat and a partially dried food material are mixed, and then subjected to freeze drying, process difficulties are encountered and the final product has undesirable characteristics. More specifically, unless the mixture is prefrozen, which adds considerably to the expense of the operation, the meat particles become altered at their outer surfaces, a dense tough "skin" being formed around the particles, resulting in a "case-hardening" condition. Not only does this adversely affect the appearance of the product, but it also interferes with subsequent rehydration when the product is being prepared for cooking.

Even when prefreezing is employed, the resulting product does not rehydrate satisfactorily. The vegetable and cereal components of the mix tend to hydrate at a different rate from the meat component. Also, the meat and nonmeat particles are not as closely united as would be desirable, and may tend to separate during the rehydration or cooking of the product. Also, the relatively slow freezing rate that is typical of all commercial freezing procedures sometimes causes a displacement of the natural water in the meat and the soluble materials carried by that water. The chemical denaturation resulting from this translocation of meat constituents is well known, and it is generally accepted that very rapid freezing rates will minimize such undesirable changes.

It is, therefore, a principal object of this invention to provide a method of preparing freeze-dehydrated meat mixes which substantially overcomes the problems described above. More specifically, it is an object of this invention to provide a method which results in a product that rehydrates uniformly and which can be used to prepare a well-integrated, homogeneous meat loaf, or the like. Still another object is to provide a method of the character described which does not require any pre-freezing step. Yet another objective is to provide a product which will suffer a minimum of undesirable chemical change which results from slow freezing rates. Further objects and advantages will be indicated in the following detailed specification.

While the method of this invention can be applied to meat mixes containing cooked meat, it is preferable to employ ground fresh meat, such as pork, beef, chicken, lamb, veal, or mixtures of such meats. In other words, the meat will be of the type usually employed for preparing meat loaves. The meat will be ground to a sufficiently small size to permit it to be mixed with the other ingredients, although, as will subsequently be described, the initial mixture may be subjected to a further grinding operation.

Fresh vegetables, either raw or cooked, may be included in the mixture. The method is particularly adapted for use with vegetables in a dry form. For example, air-dried celery, beans, peas, etc., can be used. It will also be desirable to incorporate a cereal binder such as bread-crumbs, corn flakes, cornmeal, rice, and the like. This material is also preferably in a dry form. Where eggs or milk are to be incorporated, as may be desirable, it will be preferred to use dried eggs and dried milk.

The vegetable, cereal binders, and dairy products referred to may be described more generally as partially dehydrated food materials. They will not normally be completely dehydrated, but will contain substantially less water than in their natural state. For example, they may contain on the average of from 2% to 20% water by weight. In most preferred formulations, the water content of the non-meat food materials, when considered on a total material basis, will probably average about 5 to 10%. This compares with the much higher water content of fresh meat, which will usually fall within the range of from 40 to 70% by weight, with the average tending to be around 50 to 60%.

The relative proportions of the fresh meat and the partially dehydrated food material are not particularly critical, and proportions will be used similar to those which are presently used in meat loaves and the like. For example, from 30 to 85 parts by weight (dry basis) of ground fresh meat may be combined with from 15 to 70 parts of the partially dehydrated food material. These proportions refer to a water-free reference basis, since the final freeze-dehydrated meat mix will contain all ingredients on a substantially water-free basis. It will be understood, however, that when the fresh meat is first combined with the other food materials that the fresh meat will contain a considerably higher percentage of water than the other materials. This should be taken into consideration in calculating the proportions.

Preferably, at least 50% of the mixture is provided by the meat solids (dry basis) while the mixture contains at least 25% (dry basis) of the partially dehydrated food materials. For example, the fresh meat and partially dehydrated food material may be combined in proportions calculated on a dry basis of from 50 to 75% meat solids, together with 25 to 50% of non-meat solids.

In accordance with the present invention, there is also incorporated in the mixture a quantity of water in addition to the water contained in the fresh meat and partially dehydrated food material. For example, this added quantity of water may range from 10 to 50% of the water already contained in the meat and the food material. Where the meat contains from 40 to 70% water and the non-meat components contain from 2 to 20% water, satisfactory results can usually be obtained by adding water equal to from 15 to 30% of the total water provided by the meat and food materials.

For the purpose of controlling and reducing the temperature of the mixture, part or all of the water may be added in the form of crushed ice. This has the advantage of maintaining a desirable low temperature in the mixing step. This procedure is not essential, however, since other means of cooling and refrigeration can be employed.

It will be understood that the ingredients should be combined and mixed sufficiently to achieve a relatively uniform distribution. The uniformity of the mixture may be further improved by subjecting the mixture to a grinding or size reduction step. Where this is to be employed, the meat particles will initially be added in a larger size than that finally desired. Any of the standard methods of grinding meat mixtures can be used. The secondary grinding step, while desirable, can be omitted where all ingredients have been reduced to a proper size before the mixture is formed.

As the next step, the mixture is held under refrigeration but at a non-freezing temperature until the non-meat food material has at least partially rehydrated. For example, the meat mixture may be held and tempered for ½ hour to 8 hours at a temperature ranging from 30 to 50° F. Preferably, sufficient water has been added so that the non-meat ingredients can become substantially saturated with water while still leaving a substantially continuous phase of free water in the mixture.

After the dry components of the mixture have at least partially rehydrated, the mixture is subjected to evaporative freezing. The reason for incorporating excess water over that required for the rehydration is so that the particles of meat and food material at the start of the evaporative freezing step will be coated with unabsorbed water. The water layer on the exterior surfaces of the particles will evaporate first, causing the meat mixture to become chilled and frozen before any substantial amount of the bound water within the particles has evaporated. The presence of free water at the start of the evaporative freezing step tends to protect the particles against surface changes which might occur before the particles are frozen. The evaporative freezing rate will be extremely rapid, with resulting benefits to the quality of the product as described above.

Since the meat mixture at the start of the evaporative freezing step is in a soft, watery condition, the initial evolution of air and water vapor may cause the mixture to froth and expand in volume unless the mixture is confined between plates. For some purposes, the frothing and expansion might be considered undesirable, but it has been found to be beneficial in preparing meat mixes according to the present invention. It is, therefore, contemplated that the method of the present invention will permit the meat mixture to expand in volume during the evaporative freezing step and then to become frozen in expanded condition. The increase in volume may range from 25 to 125%, depending on how rapidly the vacuum is applied. Preferably, the expansion should be at least 50%, and good results have been obtained with an expansion of up to 100%. The expanded condition of the product permits a more rapid removal of the frozen water by sublimation, and results in a porous, open-type product which rehydrates readily and uniformly.

In other words, the method of this invention contemplates the step of freezing a meat mix containing a mass of comminuted meat and also containing unabsorbed water in addition to the water naturally present in the meat by an evaporative freezing procedure wherein the freezing step is conducted in the absence of mechanical restraint on the volume of the meat mix during the freezing whereby the volume of the frozen mass is greater than the unfrozen mass from which it is obtained. As pointed out previously, the meat mix should be free to expand during the evaporative freezing step, and should not be confined between plates or otherwise subjected to mechanical restraint which would tend to maintain its original volume.

After the meat mix has been frozen in expanded condition through evaporative cooling, it is subjected to the usual freeze drying procedure wherein the remaining water is removed by sublimation. After the moisture content has been reduced to below 5% and preferably below 2%, the product is ready for packaging and commercial distribution. The dried product can be broken up to facilitate handling and packaging. For example, it can be shredded or ground, being easily broken up in the dry state. It is not necessary to have all of the particles of the product of similar size, and the product may be in the form of irregular-sized granules containing both meat and non-meat materials.

When it is desired to prepare the meat mix for cooking, all that is required is to add water sufficient to rehydrate the materials. For example, from ½ to 1½ parts by weight of water should be added per part of a dehydrated meat mix. For most formulations, approximately equal parts by weight of the meat mix and water can be used. It is desirable to avoid excess water in preparing the meat mix for cooking, since the evaporation of the excess water will increase the required cooking time. The meat loaf will then be cooked in the regular way, or used to prepare other food products such as meatballs, spaghetti sauce, etc.

If desired, other ingredients, such as fresh eggs, whole milk, canned tomatoes, and the like, may be combined with the meat mix. These other ingredients may be added at the same time as the water for rehydration.

No special equipment is required for practicing this invention. Standard mixing equipment may be used for combining the fresh meat, water, and partially dehydrated food materials. The holding or tempering step may be carried out in refrigerated storage rooms, the meat mix being contained in shallow trays, which can be loaded into the vacuum drying equipment. Freeze drying equipment of a heated plate type can be used quite satisfactorily. In accordance with known practice, the trays containing the material for evaporative freezing and dehydration are placed on the plates within the drying chamber, and the unit is sealed. A high vacuum is then applied, which may be created by steam ejectors, or similar equipment. For example, the pressure may be reduced to 2 mm. Hg downward to approximately .3 to .5 mm. Hg. As soon as the product has become frozen, the circulation of heating fluid to the plates is started, and the freeze drying operation is carried out in the usual way.

The method of this invention is further illustrated by the following specific examples:

*Example 1*

A chicken loaf was prepared by mixing together the following ingredients, which included fresh and partially dehydrated ingredients:

9 lbs. chicken (ground through ⅜" and 3/16" opening)
135 gm. minced onions (air-dry, raw)
960 gm. eggs (fresh)
180 gm. margarine
135 gm. celery (air-dry stalk granules)
199.2 gm. seasoning
540 gm. bread (non-seasoned fine crumbs)

The fresh and partially dehydrated ingredients were mixed with a little water and blended, and then the other ingredients were added. Cold water was then added to this mixture at a rate of 1½ lbs. of water to 8 lbs. of mix. The total water added was estimated to equal about 35% of the water already contained in the meat and food material. After further mixing, the product was spread on trays and freeze-dehydrated, using the evaporative freezing technique.

In the initial stage, the pressure was reduced to 105 mm. Hg, but no heat was applied to the plates. The chicken loaf mix, which was in a soft, watery condition, expanded over 50% in volume before being frozen by the evaporation of the water. This resulted in a porous, open-type product which facilitated the removal of the rest of the water by sublimation. During the sublimation stage, the plates were heated to a temperature of 130° F., and the application of the heat and vacuum was continued for 14½ hours. The drying was discontinued when the moisture content was reduced below 2%. The resulting product was broken up into regular sized pieces to facilitate handling and packaging.

*Example 2*

A beef loaf was prepared by blending the following ingredients, which included fresh and partially dehydrated ingredients:

28 lbs. 5 oz. beef
3 lbs. 7 oz. bread
1 lb. 15 oz. water
4 lbs. 8 oz. eggs
3 lbs. 6 oz. celery
2 lbs. 8 oz. onions
1 lb. 6 oz. nonfat milk solids
1 lb. 6 oz. hydrogenated shortening
1 lb. 0 oz. margarine
12 oz. tomato paste
12 oz. high absorption nonfat milk solids
325.7 gm. seasonings The fresh and partially dehydrated ingredients were mixed with a little water and blended, and then the other ingredients were added. After mixing all the ingredients together, the entire mixture was passed through a grinder plate with 3/16" holes. Water was added to the product at the rate of 1½ lbs. per 6 lbs. of mix. This 1½ lbs. of water was estimated to equal about 40% of the water already contained in the mixed meat and food material. The mixture, after rehydration of the dehydrated ingredients, was then spread evenly on trays, and freeze-dehydrated as described in Example 1.

*Example 3*

A beef loaf was prepared by mixing together the following ingredients, which included fresh and partially dehydrated ingredients:

28 lbs. 5 oz. beef (3/8" ground beef chucks)
3 lbs. 7 oz. bread (non-seasoned stuffing bread)
1 lb. 15 oz. water
4 lbs. 8 oz. eggs (fresh)
3 lbs. 6 oz. celery (cleaned fresh, 3/8" diced stalks)
2 lbs. 8 oz. onions (cooked, ground through 3/8" holes)
1 lb. 6 oz. nonfat milk solids
1 lb. 6 oz. hydrogenated shortening
1 lb. 0 oz. margarine
12 oz. tomato paste
12 oz. high absorption nonfat milk solids The fresh and partially dehydrated ingredients were mixed with a little water and blended, and then the other ingredients were added. Ten pounds of crushed ice were added during mixing and the entire mixture was then ground through a 3/16" grinder plate. This 10 lbs. of ice was estimated to equal about 30% of the water already contained in the mixed meat and food material. The mixture was then spread on dehydrater trays and freeze-dehydrated as described in Example 1.

*Example 4*

A meat loaf was prepared by mixing the following ingredients together:

14 lbs. 8½ oz. beef (beef chuck ground 1")
2 lbs. 4 oz. eggs (fresh)
3¼ oz. celery (air dried celery stalk granules) (5% moisture)
11 oz. milk (nonfat dry milk solids)
11 oz. hydrogenated shortening
8 oz. margarine
6 oz. tomato paste
6 oz. high absorption milk solids
162.8 gm. seasonings
1 lb. 11½ oz. bread (non-seasoned stuffing bread)

The fresh meat and eggs and partially dehydrated other ingredients were mixed with ice and blended by grinding and the other ingredients added. Five pounds of ice were added to the mix and mixed until the ingredients were distributed evenly. The total water added was estimated to equal about 20% of the water already contained in the meat and food material. The mixture of ice and meat loaf was ground together through a 3/16" grinder plate, and, after rehydration of the dehydrated ingredients, the mixture was spread evenly on dryer trays with 12 pounds per tray. It was then freeze-dehydrated as described in Example 1.

*Example 5*

A ham loaf was prepared by mixing together the following ingredients:

13 lbs. 6½ oz. ham (3/8" ground fully cooked hams)
6 lbs. 2 oz. fresh pork (3/8" ground pork butts)
10 oz. corn flakes
1 lb. 6 oz. binder (milk solids, wheat germ and wheat gluten)
3.2 gm. cloves
3½ oz. brown sugar The fresh meat and partially dehydrated other ingredients were mixed with ice and blended by grinding, and the other ingredients added. The ingredients were mixed together with 5 lbs. of crushed ice. The total water added was estimated to equal about 45% of the water already contained in the meat and food material. The mixture was then ground through a 3/16" grinder plate to facilitate rehydration, and spread evenly on dryer trays, 12 lbs. per tray, and freeze-dehydrated as described in Example 1.

The freeze-dehydrated meat mixes prepared as described above in Examples 1–5 can be readily prepared for cooking by mixing equal parts by weight of the meat mix and water. The rehydration will proceed very rapidly, and the meat mixes can then be cooked in the regular way. If desired, other ingredients can be added during or subsequent to the rehydration.

While in the foregoing specification this invention has been described in relation to specific embodiments thereof and many details have been set forth for the purpose of illustration, it will be apparent to those skilled in the art that the invention is susceptible to other embodiments, and that many of the details described herein can be varied considerably without departing from the basic principle of the invention.

We claim:

1. The method of preparing freeze-dehydrated meat mixes, comprising forming a mixture by combining from 30 to 85 parts by weight of ground fresh meat with from 15 to 70 parts of a partially dehydrated food material, said proportions being calculated on a dry basis, also incorporating a quantity of water in said mixture in addition to the water contained in said fresh meat and said partially dehydrated food material, said added quantity of water ranging from 10 to 50% of the water already contained in said meat and said food material, holding said mixture at a refrigerated non-freezing temperature until said food material has at least partially rehydrated, but without said food material absorbing all of said added water, then subjecting said mixture to evaporative freezing, the particles of meat and food material of said mixture at the start of said freezing step being coated with unabsorbed water, said mixture expanding in volume during said evaporative freezing step and becoming frozen in expanded condition, and thereafter drying the frozen expanded mixture by sublimation.

2. The method of claim 1 wherein said mixture expands at least 25% in volume during said evaporative freezing step.

3. The method of claim 1 wherein said fresh meat contains from 40 to 70% water and said partially dehydrated food material contains from 2 to 20% water, and wherein the quantity of added water ranges from 15% to 30% of the water contained in said meat and said food material.

4. The method of preparing freeze dehydrated meat mixes, comprising forming a mixture of ground fresh meat and a partially dehydrated food material, the proportions being such that from 50 to 75% of meat solids calculated on a dry basis are combined with from 25% to 50% of the food material solids, also incorporating a quantity of water in said mixture in addition to the water contained in said fresh meat and said partially dehydrated food material, said added quantity of water ranging from 10 to 50% of the water already contained in said meat and said food material, holding said mixture at a refrigerated non-freezing temperature until said food material has at least partially rehydrated, but without said food material absorbing all of said added water, then subjecting said mixture to evaporative freezing, the particles of meat and food material of said mixture at the start of said freezing step being coated with unabsorbed water, said mixture expanding in volume during said evaporative freezing step and becoming frozen in expanded condition, and thereafter drying the frozen expanded mixture by sublimation.

5. The method of claim 4 wherein said mixture expands at least 50% in volume during said evaporative freezing step.

6. The method of claim 4 wherein said fresh meat contains from 40 to 70% water and said partially dehydrated food material contains from 2 to 20% water, and wherein the quantity of added water ranges from 15% to 30% of the water contained in said meat and said food material.

7. The method of claim 4 wherein at least part of said water is added as crushed ice.

8. The method of preparing freeze-dehydrated meat mixes, comprising forming a mixture by combining from 30 to 85 parts by weight of ground fresh meat with from 15 to 70 parts of a partially dehydrated food material, said proportions being calculated on a dry basis, also incorporating a quantity of water in said mixture in addition to the water contained in said fresh meat and said partially dehydrated food material, said added quantity of water ranging from 15 to 30% of the water already contained in said meat and said food material, grinding said mixture, thereafter holding said mixture at a refrigerated non-freezing temperature until said food material has at least partially rehydrated, but without said food material absorbing all of said added water, then subjecting said mixture to evaporative freezing, the particles of meat and food material of said mixture at the start of said freezing step being coated with unabsorbed water, said mixture expanding in volume during said evaporative freezing step and becoming frozen in expanded condition, and thereafter drying the frozen expanded mixture by sublimation.

9. In a method of preparing freeze-dehydrated meat mixes, the steps of incorporating a quantity of water in said meat mix in addition to the water contained within the particles of the mix, said added quantity of water ranging from 10 to 50% of the water contained within the particles of said mix, and subjecting said meat mix to evaporative freezing, the particles of said mix at the start of said freezing step being coated with unabsorbed water and said freezing step being conducted in the absence of mechanical restraint on the volume of said mix during said freezing, whereby the volume of the frozen mix is greater than that of the unfrozen mix from which it is obtained, and thereafter drying the frozen expanded mix by sublimation.

References Cited in the file of this patent

UNITED STATES PATENTS

| | | |
|---|---|---|
| 2,346,232 | Piret et al. | Apr. 11, 1944 |
| 2,549,743 | Zimmerman | Apr. 17, 1951 |
| 2,930,139 | Brynko et al. | Mar. 29, 1960 |

OTHER REFERENCES

"Food Technology," November 1957, pages 599 to 603, inclusive, article entitled Freeze-Dried Meat by A. L. Toppel et al.